(No Model.)

L. T. SLYE.
NOSE RING FOR SWINE.

No. 305,024. Patented Sept. 9, 1884.

Witnesses

Inventor
L. T. Slye,
by Heylmun & Kane
Attorneys.

UNITED STATES PATENT OFFICE.

LINNEOUS T. SLYE, OF UPPER SANDUSKY, OHIO, ASSIGNOR OF ONE-HALF TO GEORGE W. BEERY, JR., OF SAME PLACE.

NOSE-RING FOR SWINE.

SPECIFICATION forming part of Letters Patent No. 305,024, dated September 9, 1884.

Application filed May 18, 1883. (No model.)

*To all whom it may concern:*

Be it known that I, LINNEOUS T. SLYE, a citizen of the United States of America, residing at Upper Sandusky, in the county of Wyandot and State of Ohio, have invented certain new and useful Improvements in Nose-Rings for Swine; and I do hereby declare the following to be a full, clear, and exact description of the invention, such as will enable others skilled in the art to which it appertains to make and use the same.

This invention has relation to improvements in nose-rings for swine, the object being to provide a device of the kind named which will effectually prevent the animal in which it is secured from rooting up the ground or doing like damage to the premises wherein he may be confined.

My invention consists in a nose-ring for swine formed of a blank provided with two perforations, the blank being bent over and down upon itself, and the two prongs or tines forming the rings passed through the perforations, as will be hereinafter fully described, and specifically pointed out in the claim.

Figure 1:
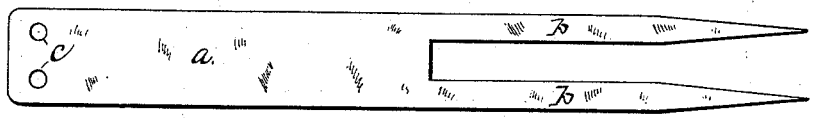
Figure 2:
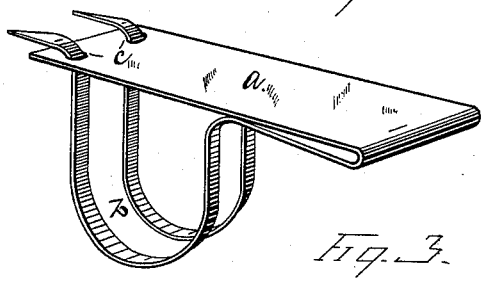
Figure 3:
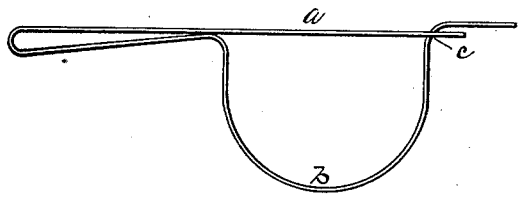
Figure 4:
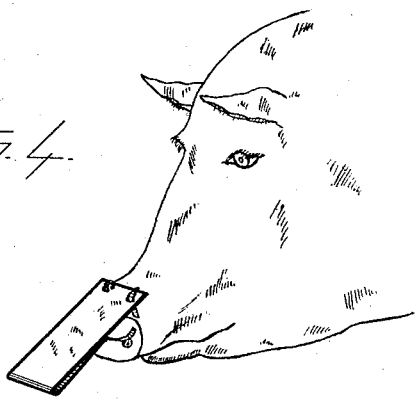

In the accompanying drawings, forming a part of this specification, Figure 1 is a view of the pronged plate with perforations. Fig. 2 is a perspective view of the ring closed with the prongs in place through the perforations in the plate. Fig. 3 is a side elevation; and Fig. 4 is a view showing the ring applied to the nose of an animal.

The letter A represents the blank for the nose-rings, consisting of the plate $a$ and the prongs or tines $b$, and provided with the perforations $c$, near the end, for the purpose of receiving and retaining the ends of the prongs or tines, which, when bent over to form the rings which go through the snout of the animal, pass through these perforations for a short distance, substantially as shown in the drawings.

To effectuate the ends of my invention the blank in the part $a$ is bent over and down on itself for a desired distance, substantially as seen in Fig. 3 of the drawings. The prongs or tines are then bent in the form of arches or rings, and the points brought through the perforations and struck up against the plate. The device can be applied by any suitable means, the prongs or tines being run through the tough portion of the snout and brought out and passed through the perforations and struck up or curled to prevent their displacement.

The advantages claimed for my improved nose-ring are the construction of the double ring in connection with the solid plate through which the ends of the prongs pass, prevents the animal from getting fast on obstructions, and the solid connections of the double loop or ring also prevent the guard or plate from turning to one side and exposing the animal's snout for use, and to work damage.

It will be observed that the ring is so formed that the most durable parts are subjected to whatever wear and tear may take place, and that by securing the prongs through the perforations a very secure fastening is obtained which holds the plate square in front and always in the proper position.

I am aware that a nose-ring has heretofore been made consisting of a base-plate with two holes at one end, and two prongs extending from the other end, the complete ring being formed by bending the blank and passing the prongs through the holes in the base-plate and clinching them down. I therefore make no claim to this specific construction; but

What I claim as my invention, and desire to secure by Letters Patent, is—

An improved nose-ring for swine, consisting of the blank $a$, provided with the two perforations $c$, said blank being bent over and down upon itself, and having the two prongs or tines $b$, forming the rings, the ends whereof pass through the perforations, substantially as described.

In testimony whereof I affix my signature in presence of two witnesses.

LINNEOUS T. SLYE.

Witnesses:
G. W. BEERY, Jr.,
W. R. HARE.